3,386,904
DESYL ARYL SULFIDES AS POLYMERIZATION INITIATORS
Constantine C. Petropoulos, Dayton, Ohio, assignor to The National Cash Register Company, Dayton, Ohio, a corporation of Maryland
No Drawing. Filed Dec. 31, 1964, Ser. No. 422,532
14 Claims. (Cl. 204—159.24)

ABSTRACT OF THE DISCLOSURE

A chemical composition containing a monomer, tetraethylene glycol dimethylacrylate, and a compound of the class of desyl aryl sulfides, for example, desyl phenyl sulfide, which catalyze the photopolymerization of the monomer. A process for polymerizing a monomer, tetraethylene glycol dimethylacrylate, in which a desyl phenyl sulfide is dissolved in the monomer and the solution is exposed to ultraviolet light.

---

This invention relates to photopolymerizable compositions and the process of polymerizing such compositions. More particularly it relates to a composition of an ethylenically unsaurated compound, tetraethylene glycol dimethacrylate, and a photo-activated polymerization catalyst (also termed an initiator), and to a process of polymerizing such compound in the presence of ultraviolet light and the catalyst.

Although various light-activated polymerization catalysts have heretofore been used in the process of polymerizing ethylenically unsautrated compounds, unsatisfactory results have been obtained in many instances because of undesirably slow rates of polymerization, excessive discoloration of the final polymer product, and thermal instability of the catalyst-monomer composition prior to the initiation of the polymerization.

Therefore, an object of this invention is to provide a new thermally stable photopolymerizable composition of tetraethylene glycol dimethacrylate. A further object is to provide a novel process of polymerizing tetraethylene glycol dimethacrylate in the presence of ultraviolet light and a photo-activated polymerization catalyst. Other objects will appear from the following description.

It has been found that the above objects can be accomplished according to the present invention by exposing to ultraviolet light a composition comprising tetraethylene glycol dimethacrylate and a desyl aryl sulfide catalyst. These catalyst compounds have the formula

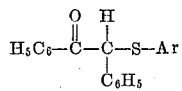

in which Ar is an aryl radical, the term "aryl," for purposes of this invention, including both substituted and unsubstituted aryl radicals; for example, phenyl, o-tolyl, p-tolyl, p-anisyl (p-methoxyphenyl) and β-naphthyl radicals.

Generally, the amount of the catalyst can be varied over rather wide limits ranging from about .01% up to as much as 5% or more, by weight, based on the weight of the tetraethylene glycol dimethacrylate. Although amounts of catalyst greater than 5% can be employed, such amounts provide little increase in the rate or amount of polymerization and thus serve little practical purpose. For practical rates of polymerization, amounts of catalyst ranging from about .1% to about 2% are preferred.

The process provided by this invention can be carried out by any of the conventional methods usually employed in photopolymerization; for example, solution, bulk, and emulsion methods. Preferably, the ultraviolet-light-activated polymerization catalyst is dissolved in the tetraethylene glycol dimethacrylate, and the resulting solution is irradiated with ultraviolet light. Particularly effective sources of ultraviolet light include sunlight and electric arcs having sufficient emission in the ultraviolet range.

The desyl aryl sulfides employed as photo-initiated polymerization catalysts can be prepared by the method of Schönberg et al. disclosed on page 90 (1942) of the Journal of the Chemical Society and on pages 1224 and 1225, volume 78 (1956), of the Journal of the American Chemical Society. In a similar method, sodium methoxide (0.0086 mole) and an arylthiol compound, p-methoxy thiophenol (0.0086 mole) in 25 milliliters of toluene were stirred vigorously with a magnetic stirrer while under reflux for one hour. Then 15 milliliters of the toluene solvent, together with methanol formed in the reaction, were azeotropically distilled to remove most of the methanol. Desyl chloride (0.0086 mole) dissolved in 15 milliliters of toluene was added to the mixture, and the system was refluxed for three hours. The sodium chloride formed in the reaction and any residual methanol were then extracted from the toluene solution with two 2-milliliter portions of water. The aqueous portions were combined and washed once with fresh toluene. The organic toluene layers were combined and dried with anhydrous calcium chloride, and the solvent was evaporated under a vacuum. The residue was then recrystallized from ligroin (B.P. 66 to 75 degrees centigrade) or n-hexane.

β-naphthyl desyl sulfide was prepared by use of the same procedure and proportions. However, some β-naphthyl disulfide was also obtained due to the air-oxidation of the sodium salt of the thionaphhol. This was separated from the desyl sulfide derivative by fractional recrystallization from ethanol. The disulfide separated first. The β-naphthyldesyl sulfide was recovered from the filtrate and recrystallized from the specified ligroin.

The following examples are illustrative of the invention.

Example 1

A 2%, by weight, solution of desyl phenyl sulfide dissolved in tetraethylene glycol dimethacrylate was prepared. A 100-milligram sample of the solution was placed in an ultraviolet-light-transparent reaction vessel in a constant temperature bath at 25 degrees centigrade. After temperature equilibrium was reached, the solution was exposed to a Gates mercury lamp. A hard gelled polymeric material was obtained in approximately one minute.

Solutions comprising 0.1%, 0.5%, and 1.0%, by weight, of desyl phenyl sulfide dissolved in the mentioned monomer were prepared. Using the same procedure as above, each of the solutions was exposed to the mercury lamp. In each case, proportionally fast reaction times were obtained.

Examples 2 to 5

As in Example 1, 2.0%, 1.0%, 0.5%, and 0.1%, by weight, solutions of each of o-tolyl, p-tolyl, p-anisyl, and β-naphthyl desyl sulfide in tetraethylene glycol dimethacrylate were prepared in the same amounts. Polymerization of the monomer was accomplished in the same manner as described in Example 1. In each case, a hard gelled polymeric material was obtained within two minutes when the 2% solutions were employed, and proportionally fast polymerization reactions were obtained for the other solutions of each desyl aryl sulfide. Under the same experimental conditions, attempted photo-polymerization of the tetraethylene glycol monomer alone (without any desyl aryl sulfide catalyst) resultde in the formation of only 2%, by weight, polymer, based on the starting weight of the monomer, after six minutes.

As is evident, the utilization of the aforementioned desyl aryl sulfides as photo-activated initiators in the process of polymerizing tetraethylene glycol dimethacrylate reduces considerably the time required for completion of the polymerization. The process can be employed in bonding two materials together, at least one of which is sufficiently transparent to permit the passage therethrough of the requisite amount of ultraviolet light to accomplish the activation of the desyl aryl sulfide catalyst. The process can also be employed in forming insoluble films of tetraethylene glycol dimethacrylate in terms of polymeric film configurations as delineated by the exciting ultraviolet light.

What is claimed is:

1. A process for preparing polymeric tetraethylene glycol dimethacrylate material comprising exposing to ultraviolet light a composition consisting essentially of tetraethylene glycol dimethacrylate having dispersed therein at least .01% by weight of a desyl aryl sulfide.
2. The process of claim 1 in which there is present about 0.1% to about 2.0%, by weight, of the desyl aryl sulfide.
3. The process of claim 1 in which the desyl aryl sulfide is desyl phenyl sulfide.
4. The process of claim 1 in which the desyl aryl sulfide is desyl o-tolyl sulfide.
5. The process of claim 1 in which the desyl aryl sulfide is desyl p-tolyl sulfide.
6. The process of claim 1 in which the desyl aryl sulfide is desyl p-anisyl sulfide.
7. The process of claim 1 in which the desyl aryl sulfide is desyl β-naphthyl sulfide.
8. A photopolymerizable composition consisting essentially of monomeric tetraethylene glycol dimethacrylate having dispersed therein at least .01%, by weight, of a desyl aryl sulfide.
9. The composition of claim 8 in which there is present about 0.1% to about 2.0%, by weight, of the desyl aryl sulfide.
10. The composition of claim 8 in which the desyl aryl sulfide is desyl phenyl sulfide.
11. The composition of claim 8 in which the desyl aryl sulfide is desyl o-tolyl sulfide.
12. The composition of claim 8 in which the desyl aryl sulfide is desyl p-tolyl sulfide.
13. The composition of claim 8 in which the desyl aryl sulfide is desyl p-anisyl sulfide.
14. The composition of claim 8 in which the desyl aryl sulfide is desyl β-naphthyl sulfide.

References Cited
UNITED STATES PATENTS

| | | | |
|---|---|---|---|
| 2,641,576 | 6/1953 | Sachs et al. | 240—159.23 |
| 2,895,950 | 7/1959 | Krieble | 260—89.5 |

OTHER REFERENCES

Burland and Hoffman, Block and Graft Polymers, 1960, pp. 97–98.

Schonberg et al. J. Amer. Chem. Soc. Photochemical Reactions in Sunlight, Part XIX, Experiments with Desoxybenzoin Derivatives, vol. 78, (1956) pp. 1224–1225.

MURRAY TILLMAN, *Primary Examiner.*

SAMUEL BLECH, *Examiner.*

R. B. TURER, *Assistant Examiner.*